Figure 1:
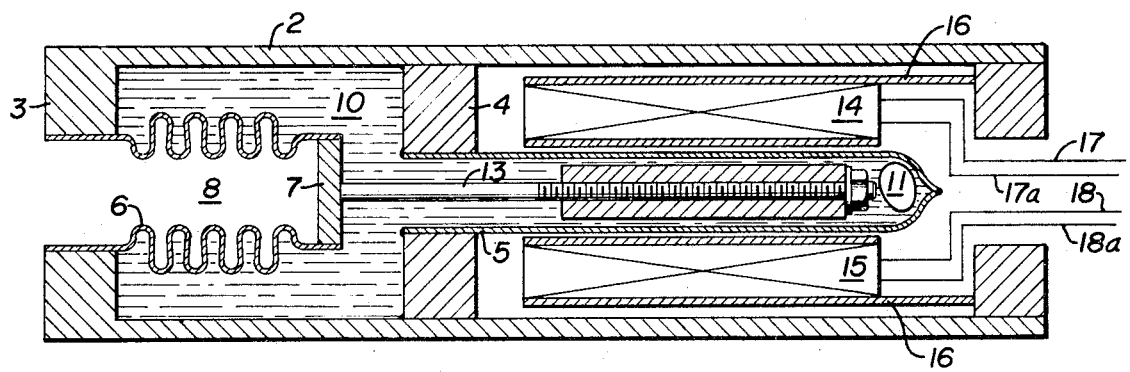

United States Patent

King

[15] 3,638,496
[45] Feb. 1, 1972

[54] PRESSURE TRANSDUCER
[72] Inventor: Earle C. King, Evans City, Pa.
[73] Assignee: Mine Safety Appliances Company, Pittsburgh, Pa.
[22] Filed: June 15, 1970
[21] Appl. No.: 45,995

[52] U.S. Cl. ....................................................73/398 R
[51] Int. Cl. ...........................................................G01l 9/10
[58] Field of Search .....................73/398 R, 407 R; 336/30

[56] References Cited

UNITED STATES PATENTS 3,492,872  2/1970  Caspar et al. ..............................73/407
3,068,700  12/1962  Bourns......................................73/398

Primary Examiner—Donald O. Woodiel
Attorney—Ronald H. Shakely

[57] ABSTRACT

A pressure transducer has a chamber partitioned into two compartments by a movable wall; one compartment is open to the fluid pressure to be measured; the other compartment is closed and filled with a liquid and a predetermined amount of gas. The movable wall assumes a position that equalizes the pressure in the two compartments and electrical means indicate the position of the movable wall.

3 Claims, 1 Drawing Figure

PATENTED FEB 1 1972 3,638,496

INVENTOR
EARLE C. KING
BY Ronald H Shakely

PRESSURE TRANSDUCER

This invention relates to a pressure transducer that generates an electrical output signal dependent on a fluid pressure input.

The pressure transducer of this invention comprises a chamber partitioned by a movable wall into two compartments; one compartment is in communication with the fluid pressure to be measured and the other compartment is closed and filled with a liquid and a predetermined mass of gas, hereinafter referred to as the gas bubble. The partitioning wall is movable in response to a pressure differential on its opposite sides to reach a position, by changing the volume of the gas bubble, at which the pressure in the two compartments is equalized. The position of the movable wall is dependent on the fluid pressure applied to the first compartment and the position of the wall is indicated by a position-responsive electrical means.

The accompanying drawing is a vertical section of a preferred embodiment of this invention.

Referring to the drawing, a chamber formed by housing 2, end wall 3, annular wall 4, and closed-end tube 5, is divided into two compartments by bellows 6 having an end wall 7. The first compartment 8 opens to the fluid pressure to be measured. The second compartment 9 is hermetically sealed and filled with liquid 10 and a gas bubble 11. A transformer core 12 is connected by rod 13 to end wall 7 of the bellows. Primary windings 14 and secondary windings 15 of a linear variable differential transformer are arranged outside tube 5 and are supported by supports 16 secured to the housing. The leads 17, 17a to the primary winding are connected to an AC source, and the leads 18, 18a are connected from the secondary winding are connected to an AC source, and the leads 18, 18a are connected from the secondary winding to a conventional electrical measuring or control means to determine the output. Suitably the output may be connected to a demodulator that amplifies and rectifies the transformer signal to provide a DC output that may be measured by a potentiometer or DC voltmeter.

In operation, an increase in pressure in compartment 8, will cause the bellows to expand, compressing the gas bubble until the pressure in compartment 10 is equal to that in compartment 8. The expansion of the bellows causes a movement to the right of the transformer core, increasing the output of the secondary transformer windings. When the pressure in compartment 8 is reduced, the bellows contracts, expanding the gas bubble until the pressure in compartment 10 is equalized with that in compartment 8. Thus the bellows assumes a stabilized degree of expansion that maintains the transformer core at a given position for a given pressure. The output from the secondary winding of the differential transformer varies with varying positions of the core, providing an electrical signal that is dependent on the pressure in compartment 8.

Among the advantageous features of my new pressure transducer, it should be recognized that the null balance measurement in which the pressure in both compartments is equalized exerts no stress on the bellows. Also, the measurement is made by a balance of fluid pressures, so the accuracy of the device is not affected by changes in material strength and characteristics on aging, such as spring fatigue, which is of special significance in high-temperature devices for use with liquid metals. The degree of bellows expansion for a given change in pressure, can be regulated simply by changing the amount of gas in chamber 9. By changing the amount of gas bubble, a single apparatus can be modified to measure a variety of pressure ranges with various degrees of precision.

Although any fluid and any gas inert to the fluid may be used in the closed chamber, it is preferred to use fluid that has substantially constant vapor pressure over the temperatures at which the transducer is to operate and to use a gas that has a substantially constant solubility in the liquid over the pressure and temperature at which the transducer is to operate and to use a gas that has a substantially constant solubility in the liquid over the pressure and temperature range of operation. Alloys of alkali metals that are liquid at normal ambient temperatures are especially desirable as they have an extremely wide liquid range; suitably, binary alloys such as, for example, sodium-potassium alloys containing from about 67 to 82 percent sodium that melt below about 32° F. and boil above about 1,400° F.; or ternary alloys, such as for example sodium-potassium-cesium alloys that are liquids at temperatures as low as −110° F.; and other alloys containing two or more alkali metals. Gases such as argon, nitrogen and helium, are inert to liquid metals and suitable for use as gas bubbles with alkali metal alloys, Combination of liquid and gases in which there is a large change of solubility with varying conditions do reach stable, reproducible equilibrium conditions and can be used in this invention, but some time may be required to reach such equilibrium except over limited ranges of temperature and pressure.

It will be recognized by those skilled in the art that other position-responsive electrical means may be used in place of the differential transformer. For example, a capacitance pickup may be positioned to be responsive to movement of a dielectric element secured to the movable wall.

I claim:

1. A pressure transducer comprising a fixed-dimension chamber, a single movable partition means dividing the chamber into two compartments, the first compartment being in communication with the fluid pressure to be measured, the second compartment being closed and filled with a liquid and a predetermined mass of gas inert to and substantially insoluble in the liquid, said partition means being movable in response to a pressure differential on its opposite sides to change the volume of said gas and thereby equalize the pressure in the first and second chambers, an electrically active element, a motion-transmitting means connecting the active element to said partition means, and means generating an electrical signal dependent on the position of the active element.

2. A pressure transducer according to claim 1, in which the liquid is an alloy of at least two alkali metals.

3. A pressure transducer according to claim 2, the second compartment having in axial alignment a first, cylindrical portion and a second cylindrical portion of smaller diameter than the first portion, the partition means consisting of a bellows in axial alignment with and within the first portion, a differential transformer core, rigid means securing the transformer core to the bellows and supporting the transformer core in axial alignment within the second portion.

* * * * *

UNITED STATES PATENT OFFICE
CERTIFICATE OF CORRECTION

Patent No. 3,638,496                Dated February 1, 1972

Inventor(s) Earle C. King

It is certified that error appears in the above-identified patent and that said Letters Patent are hereby corrected as shown below:

Column 1, lines 32 and 33, delete "are connected to an AC source, and the leads 18, 18a are connected from the secondary winding". Column 2, line 3, "gas bubble" should read -- gas in the gas bubble --; lines 11-13, delete "at which the transducer is to operate and to use a gas that has a substantially constant solubility in the liquid over the pressure and temperature".

Signed and sealed this 13th day of June 1972.

(SEAL)
Attest:

EDWARD M. FLETCHER, JR.              ROBERT GOTTSCHALK
Attesting Officer                   Commissioner of Patents